US012606269B2

(12) United States Patent
Wang

(10) Patent No.: US 12,606,269 B2
(45) Date of Patent: Apr. 21, 2026

(54) LABOR-SAVING FOLDABLE PEDAL

(71) Applicant: Xiangjun Wang, Anhui (CN)

(72) Inventor: Xiangjun Wang, Anhui (CN)

( * ) Notice: Subject to any disclaimer, the term of this patent is extended or adjusted under 35 U.S.C. 154(b) by 2 days.

(21) Appl. No.: 18/728,463

(22) PCT Filed: Jan. 5, 2023

(86) PCT No.: PCT/CN2023/070717
§ 371 (c)(1),
(2) Date: Jul. 12, 2024

(87) PCT Pub. No.: WO2023/134538
PCT Pub. Date: Jul. 20, 2023

(65) Prior Publication Data
US 2025/0074540 A1 Mar. 6, 2025

(30) Foreign Application Priority Data

Jan. 15, 2022 (CN) .......................... 202210063867.6

(51) Int. Cl.
B62M 3/08 (2006.01)
B62K 15/00 (2006.01)

(52) U.S. Cl.
CPC ......... B62M 3/08 (2013.01); *B62K 2015/003* (2013.01)

(58) Field of Classification Search
None
See application file for complete search history.

(56) References Cited

FOREIGN PATENT DOCUMENTS

| | | | | |
|---|---|---|---|---|
| CN | 2740525 | | 11/2005 | |
| CN | 200985081 | | 12/2007 | |
| CN | 203623894 | | 6/2014 | |
| CN | 203623894 U | * | 6/2014 | |
| CN | 110576933 | | 12/2019 | |
| CN | 110576933 A | * | 12/2019 | .............. B62M 3/00 |
| CN | 210437339 | | 5/2020 | |
| CN | 210437339 U | * | 5/2020 | |
| CN | 212890788 | | 4/2021 | |
| EP | 0718183 | | 6/1996 | |
| EP | 0718183 A1 | * | 6/1996 | .............. B62M 3/00 |

OTHER PUBLICATIONS

"International Search Report (Form PCT/ISA/210) of PCT/CN2023/070717", mailed on Mar. 27, 2023, with English translation thereof, pp. 1-4.

* cited by examiner

*Primary Examiner* — Vicky A Johnson

(57) ABSTRACT

The labor-saving foldable pedal includes a footboard and a labor-saving rod. The labor-saving rod has a first end configured to be transversely hingedly connected to a bicycle driving crank, and a second end longitudinally hingedly connected to the footboard, and bearing limiting structures corresponding to each other are respectively provided at the second end of the labor-saving rod and a longitudinal hinge end of the footboard.

8 Claims, 2 Drawing Sheets

LABOR-SAVING FOLDABLE PEDAL

CROSS-REFERENCE TO RELATED APPLICATION

This application is a 371 of international application of PCT application serial no. PCT/CN2023/070717 filed on Jan. 5, 2023 which claims the priority benefit of China application no. 202210063867.6 filed on Jan. 15, 2022. The entirety of each of the above mentioned patent applications is hereby incorporated by reference herein and made a part of this specification.

TECHNICAL FIELD

The present disclosure relates to the technical field of pedals, and particularly relates to a labor-saving foldable pedal.

DESCRIPTION OF RELATED ART

The smaller a transverse dimension of a bicycle pedal after folding is, the more convenience the bicycle pedal becomes. However, a transverse hinge shaft of the existing foldable pedals, that is, pedal axle, is disposed inside the pedal, a thickness of the pedal limits an outer diameter of a bearing sleeved on the pedal shaft. The outer diameter of the bearing and a length of the pedal axle are proportional to bearing capacity thereof. In order to obtain a certain bearing capacity, a relatively length pedal axle has to be provided. A longer pedal axle makes the transverse dimension of pedal after being folded is about 50 mm. Obviously, such a folded dimension cannot provide good convenience. In order to further reduce the size of the pedal after being folded, a quick-release pedal has been developed. A transverse dimension of a base of the quick-release pedal left on the crank is smaller, but it is difficult to store and carry the pedal after being detached. For example, the patent with the application number CN201921667060.3 has a labor-saving rod capable of saving labor, but the rod does not have a folding function. Similarly, the patents with the application numbers CN200420093884.1 and CN200620061687.0 each has a hinge shaft at a lower edge of the longitudinal hinge end thereof, a limiting block is disposed on an upper edge thereof, and a distance between a hinge shaft hole and the limiting block form a bearing force arm, which is a single limiting structure; and bearing capacity of the hinge shaft is inversely proportional to the distance between the hinge shaft and the limiting block, therefore in order to prevent the hinge shaft from being subjected to excessive load, the limiting block has to be set far away from the hinge shaft, making the pedal very thick. When being folded, the thick pedal will inevitably interfere with the crank. In order to make the pedal after being folded and unfolded stable, positioning holes, steel balls, and spring components are also provided, resulting in a complex structure.

SUMMARY

An objective of the present disclosure is to provide a labor-saving foldable pedal to solve at least one problem in the prior art.

In order to achieve the above objective, a technical solution adopted by the present disclosure is as follows:

A labor-saving foldable footboard, for which a labor-saving rod is disposed between a footboard and a crank, such that the footboard has a labor-saving function. Bearing limiting structures corresponding to each other are respectively disposed at longitudinal hinge ends of the labor-saving rod and the footboard, longitudinal hinge shafts do not bear treading force load, and the treading force load is completely borne by the bearing limiting structures, therefore, the longitudinal hinge shafts are not restricted by a bearing problem, such that a bearing force arm is greatly shortened, and is expanded to a distance from a lower edge of the footboard to an upper edge thereof, and compared with a single limiting structure, and the bearing force arm has an extra length from a center of the longitudinal hinge shafts to the lower edge of the footboard, therefore, a thinner footboard with a small transverse size after being folded can be provided, and the thinner footboard will not interfere with the crank, and the longitudinal hinge shafts are each provided with an adjustment nut, such that unfolded and folded states of the footboard are relatively stable, a positioning structure is omitted, and the problems are effectively solved.

A technical solution adopted by the present disclosure to solve the technical problems is as follows: a labor-saving foldable pedal, including a footboard and a labor-saving rod, the labor-saving rod has one end configured to be transversely hinged to a bicycle driving crank, and the other end of the labor-saving rod is longitudinally hinged to the footboard; and bearing limiting structures corresponding to each other are respectively provided at the longitudinal hinge ends of the labor-saving rod and the footboard.

Further, a transverse hinge shaft of the transverse hinge is a screw, a hole is formed on one end of the labor-saving rod, bearings are disposed inside the hole, and the screw passes through inner rings of the bearings and is screwed into a screw hole of the bicycle driving crank.

Further, a treading surface of the footboard is disposed forwards relative to the transverse hinge shaft.

Further, the footboard is a frame-shaped footboard, and the labor-saving rod is partially or completely placed inside the frame-shaped footboard in a folded state.

Further, a treading surface of the footboard in an unfolded state is tilted upwards, with a lower inner side lower and a higher outer side.

Further, shaft ends of longitudinal hinge shafts of longitudinal hinge are each provided with one adjustment nut.

Further, each of the bearing limiting structures includes at least two bearing limiting blocks.

Further, each of the bearing limiting blocks is a fan-shaped boss.

Further, when the footboard is in the unfolded state, a transverse angle of a contact surface between the two bearing limiting blocks on the footboard and the two bearing limiting blocks on the labor-saving rod is a certain value ranging from negative 60° to positive 60°.

A transmission path of the treading force of the above technical solution is: the footboard, the labor-saving rod, the crank, an intermediate transmission component, and wheels.

One end of the labor-saving rod can also be connected to a crank on other pedal-driving devices, such as a boat driven by means of pedals, and one end of the labor-saving rod is limited neither to be connected to the crank, nor to be used as a driving pedal, or can also be connected to other device components and used as a supporting pedal.

Compared with the prior art, the labor-saving foldable pedal provided by the present disclosure has the beneficial effects: on the premise of saving labor, the labor-saving foldable pedal is provided with the bearing limiting structures, the longitudinal hinge shafts do not bear treading force load, the longitudinal hinge shafts are thereby not restricted by a bearing problem, the shorter bearing force arm is adopted, the labor-saving rod and outer edge of the longitudinal hinge ends of the footboard are fully utilized as the bearing force arms, providing conditions for setting a thinner labor-saving rod and a footboard, such that an overall width of the footboard after being folded is less than 25 mm.

DESCRIPTION OF THE EMBODIMENTS

In order to more clearly illustrate the embodiments of the present disclosure or the technical solutions in the prior art, the present disclosure will be briefly described below in combination with the accompanying drawings and embodiments or the description of the prior art. Obviously, the accompanying drawings in the following description are only some of the embodiments of the present disclosure, and those ordinarily skilled in the art would also be able to derive other drawings from these drawings without making creative efforts. It should be noted that the description of these embodiments is intended to help understand the present disclosure, but does not constitute a limitation of the present disclosure.

Embodiment 1

Figure 1:
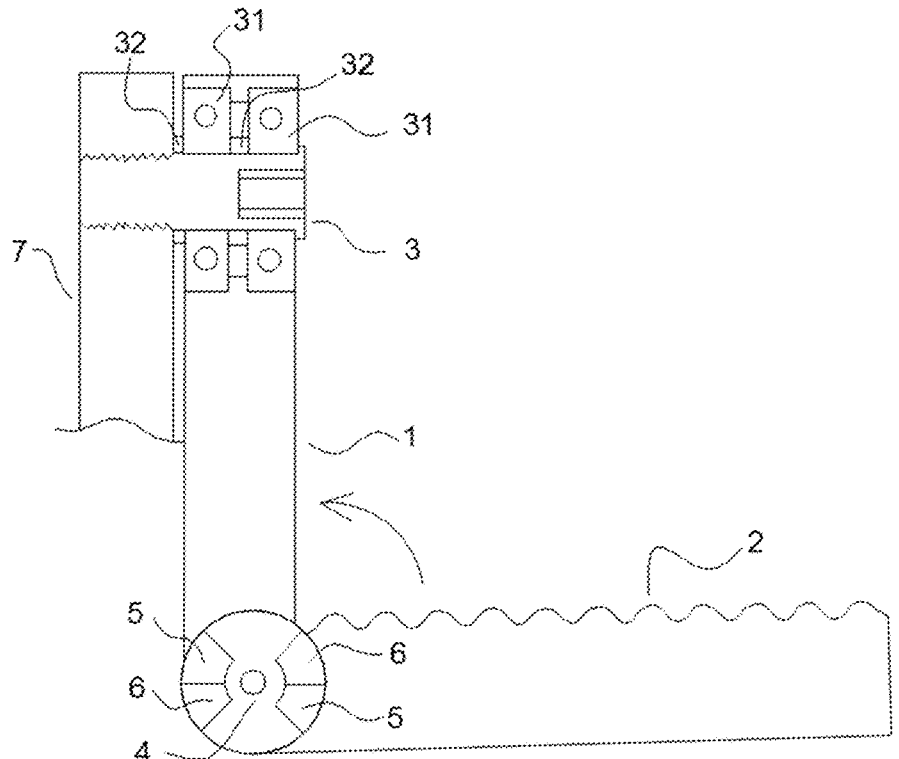
FIG. 1 is a perspective schematic diagram of a right pedal in an unfolded state according to the present disclosure.

This embodiment provides a labor-saving foldable pedal, as shown in FIG. 1, a hole is formed on one end of a labor-saving rod 1, two bearings 31 are disposed inside the hole, a screw 3 passes through inner rings of the bearings 31 and is then screwed into a screw hole of a crank 7, gaskets 32 are disposed between the two bearings 31, and between one bearing 31 and the crank 7, the other end of the labor-saving rod 1 is longitudinally hinged to a frame-shaped footboard 2 through longitudinal hinge shafts 4, two first fan-shaped bosses 5 are disposed on longitudinal hinge ends of the labor-saving rod 1, and of course, it can also be other numbers of first fan-shaped bosses 5; and two second fan-shaped bosses 6 are disposed on longitudinal hinge ends of the frame-shaped footboard 2, the number of the second fan-shaped bosses 6 on the longitudinal hinge ends of the frame-shaped footboard 2 is consistent with the number of the first fan-shaped bosses 5 on the longitudinal hinge ends of the labor-saving rod 1, and they correspond to each other, in which case, the frame-shaped footboard 2 in an unfolded state, the first fan-shaped bosses 5 contact the second fan-shaped bosses 6, and a transverse angle generated through the contact therebetween is horizontal, and a treading surface of the frame-shaped footboard 2 is tilted upwards, with an inner side lower and an outer side higher. In an embodiment, a transverse angle of a contact surface between the two bearing limiting blocks on the footboard 2 and the two bearing limiting blocks on the labor-saving rod 1 is a certain value ranging from negative 60° to positive 60°.

Figure 2:
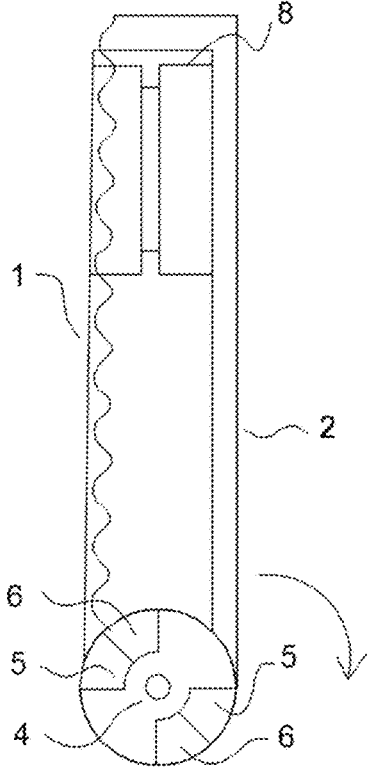
FIG. 2 is a perspective schematic diagram of a right pedal in a folded state according to the present disclosure.

As shown in FIG. 2, the hole 8 is formed on one end of the labor-saving rod 1, the other end thereof is longitudinally hinged to the frame-shaped footboard 2 through the longitudinal hinge shafts 4, the two first fan-shaped bosses 5 are disposed on the longitudinal hinge ends of the labor-saving rod 1, and the two second fan-shaped bosses 6 are disposed on the longitudinal hinge ends of the frame-shaped footboard 2, in which case, the frame-shaped footboard 2 rotates counterclockwise from the unfolded state shown in FIG. 1 to a folded state in FIG. 2, the two second fan-shaped bosses 6 rotate counterclockwise together with the frame-shaped footboard 2 from the position shown in FIG. 1 to a position in FIG. 2, and the labor-saving rod 1 is placed inside a frame of the frame-shaped footboard 2.

Figure 3:
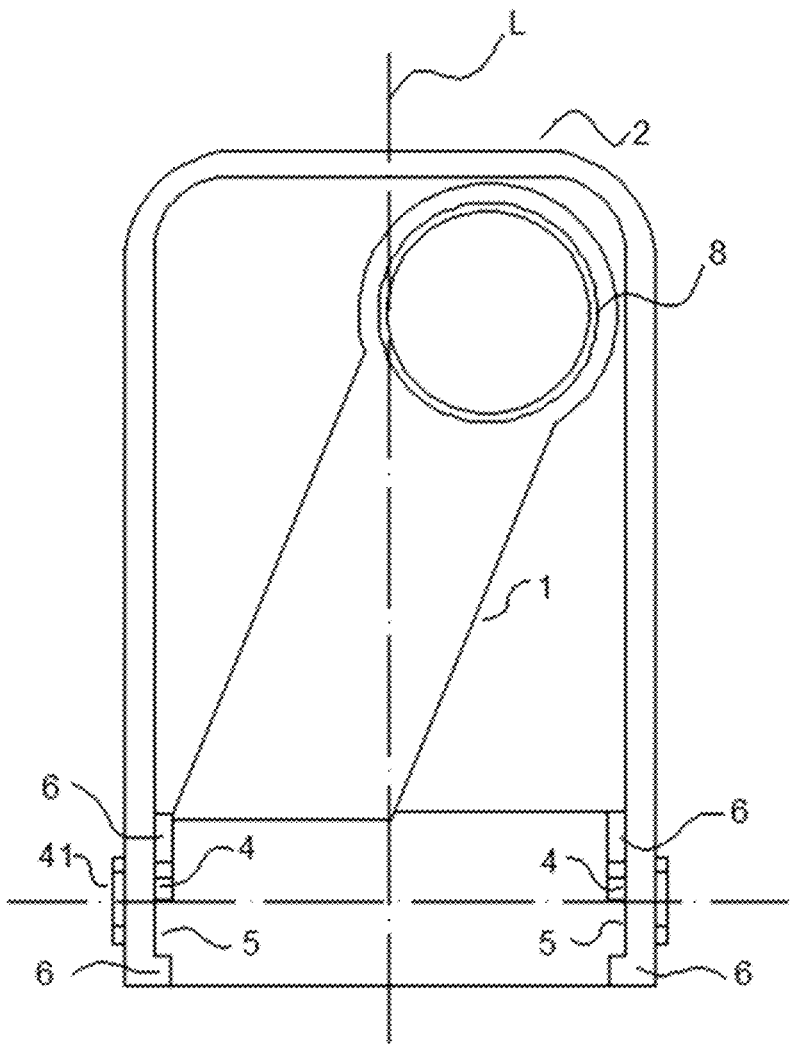
FIG. 3 is a left perspective schematic diagram of a left pedal in a folded state according to the present disclosure.

As shown in FIG. 3, the treading surface of the frame-shaped footboard 2 is disposed forwards relative to the hole 8 on one end of the labor-saving rod 1, that is, the hole 8 is formed on the labor-saving rod, a center line L of the frame-shaped footboard 2 is located in front of the center of the hole 8, the other end thereof is longitudinally hinged to the frame-shaped footboard 2 through the longitudinal hinge shafts 4, the two first fan-shaped bosses 5 are respectively disposed on outer sides of the two longitudinal hinge ends of the labor-saving rod 1, the two second fan-shaped bosses 6 are respectively disposed on inner sides of the two longitudinal hinge ends of the frame-shaped footboard 2, shaft ends of the longitudinal hinge shafts 4 are each provided with an adjustment nut 41, the two longitudinal hinge ends of the frame-shaped footboard 2 can be subjected to moderate clamping force by properly turning the adjustment nuts 41, the clamping force can cause a slight change in a distance between two ends of the frame-shaped footboard 2, and the slight change can exert proper clamping force on a contact surface between the labor-saving rod 1 and the frame-shaped footboard 2, the clamping force then forms hinged damping force, and the damping force can make the unfolded and folded states of the frame-shaped footboard 2 relatively stable, in which case, the frame-shaped footboard 2 is in the folded state, and the labor-saving rod 1 is placed inside the frame of the frame-shaped footboard 2.

In the above embodiment, the labor-saving rod 1 and the frame-shaped footboard 2 are die-casted with ADC 12 aluminum alloy, and can withstand 145 kg of treading force at 70 mm from the longitudinal hinge shafts after testing, and a size thereof after being folded is 23.5 mm.

Finally, it should be noted that the above is only a preferred embodiment of the present disclosure, and is not intended to limit the present disclosure. Any modifications, equivalent substitutions, improvements, and the like, within the spirit and principles of the present disclosure are intended to be included within the scope of protection of the present disclosure.

What is claimed is:

1. A labor-saving foldable pedal, comprising a footboard and a labor-saving rod, the labor-saving rod has a first end configured to be transversely hinged to a bicycle driving crank, and a second end of the labor-saving rod is longitudinally hinged to the footboard, wherein bearing limiting structures corresponding to each other are respectively provided at the second end of the labor-saving rod and a longitudinal hinge end of the footboard, wherein the bearing limiting structures include two first bosses disposed on the second end of the labor-saving rod and separated circumferentially when viewed longitudinally, and two second bosses disposed on the longitudinal hinge end of the footboard and separated circumferentially when viewed longitudinally, when the footboard is in an unfolded state and subjected to a treading force, a circumferential end of one of the first bosses contacts a circumferential end of one of the second bosses, a circumferential end of the other one of the first bosses contacts a circumferential end of the other one of the second bosses, the treading force forms a forcing couple on the two second bosses and a bearing couple on the two first bosses corresponding to the two second bosses.

2. The labor-saving foldable pedal according to claim 1, wherein a transverse hinge shaft is a screw, a hole is formed on the first end of the labor-saving rod, bearings are disposed inside the hole, and the screw passes through inner rings of the bearings and is screwed into a screw hole of the bicycle driving crank.

3. The labor-saving foldable pedal according to claim 2, wherein a treading surface of the footboard is disposed forwards relative to the transverse hinge shaft, and a center line of the footboard is located in front of a center of the hole.

4. The labor-saving foldable pedal according to claim 1, wherein the footboard is a frame-shaped footboard-that is, and the labor-saving rod is placed inside the frame-shaped footboard in a folded state.

5. The labor-saving foldable pedal according to claim 1, wherein a treading surface of the footboard in the unfolded state is tilted upwards, with a lower inner side and a higher outer side.

6. The labor-saving foldable pedal according to claim 1, wherein shaft ends of longitudinal hinge shafts at the second end of the labor-saving rod are provided with an adjustment nut.

7. The labor-saving foldable pedal according to claim 1, wherein the first bosses and the second bosses are fan-shaped bosses.

8. The labor-saving foldable pedal according to claim 1, wherein when the footboard is in the unfolded state, a transverse angle of a contact surface between the two second bosses on the footboard and the two first bosses on the labor-saving rod is a certain value ranging from negative 60° to positive 60°.

* * * * *